Figure 1:
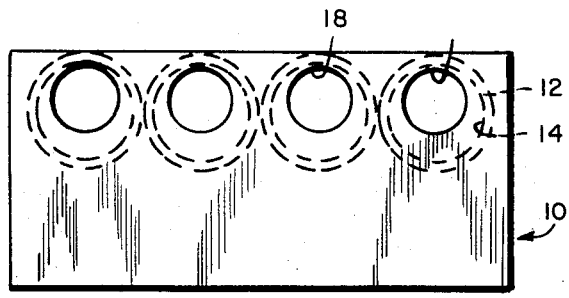

United States Patent

Van Dongen

[15] 3,699,925
[45] Oct. 24, 1972

[54] COMBINATION CAGE AND FEEDER FOR RODENTS

[72] Inventor: Cornelis G. Van Dongen, Watertown, Mass.

[73] Assignee: Bio-Research Consultants, Inc., Cambridge, Mass.

[22] Filed: June 4, 1971

[21] Appl. No.: 149,936

[52] U.S. Cl. ................................................119/18
[51] Int. Cl. .............................................A01k 01/00
[58] Field of Search..........................119/15, 17, 18

[56] References Cited

UNITED STATES PATENTS

| | | | |
|---|---|---|---|
| 3,256,859 | 6/1966 | Petit, Jr. | 119/18 |
| 3,334,614 | 8/1967 | Gass et al. | 119/18 |
| 3,505,977 | 4/1970 | Mancini | 119/61 |

*Primary Examiner*—Hugh R. Chamblee
*Attorney*—Sewall P. Bronstein, John D. Woodberry, Robert T. Gammons, Donald Brown, Robert L. Goldberg and Robert F. O'Connell

[57] ABSTRACT

A cage comprising a receptacle having a floor, a circumscribing side wall and a removable cover, the latter, at least, containing openings and a feeder adapted to be disposed in the receptacle and held therein by engagement of the cover therewith comprising a plurality of spaced parallel chambers having open and closed ends, legs connecting the chambers and adapted to support the chambers from the floor of the cage in inclined positions with their open ends at the higher level, and members adapted to extend downwardly from the cover when the latter is applied to the top of the receptacle in confronting relation to the open ends of the chambers so as to prevent a rodent standing on the floor from raising itself into the open ends of the chambers.

7 Claims, 6 Drawing Figures

PATENTED OCT 24 1972  3,699,925

COMBINATION CAGE AND FEEDER FOR RODENTS

BACKGROUND OF THE INVENTION

In my copending application there is disclosed a combination cage and feeder wherein the feeder is provided with chambers open at one end and closed at the other, supported with the open ends at a higher level than the closed ends and at such a level that a rodent attempting to obtain food from the chambers must stand on its hind legs thus making it difficult for the rodent to climb into the open ends. For some rodents, particularly the larger species, it is necessary to provide some kind of additional restraint to prevent the animal, after thrusting its head into the open end of a chamber, from climbing into the chamber and this invention provides a simple expedient for this purpose.

SUMMARY

As herein illustrated, the combination cage and feeder comprises a receptacle having a floor, a side wall circumscribing the floor and a removable cover, the latter, at least, containing holes and a feeder comprising spaced parallel chambers having open and closed ends, supported in the receptacle above the floor by means of legs, with the open ends of the chambers at a higher level than the closed ends and at a height such that the top of the feeder is engaged by the cover. To constrain an animal which is large enough to climb into the open ends of the chambers even though the openings are elevated from the floor, the cover is provided with means angling downwardly therefrom in confronting relation to the open ends of the chambers and at such close proximity thereto that while the animal may thrust its head into the open ends of the chambers it cannot raise itself thereinto.

Figure 2:
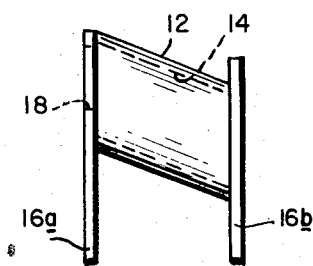
Figure 3:
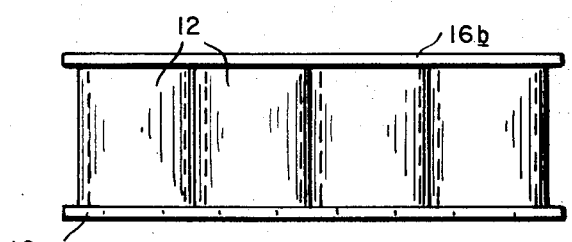
Figure 4:
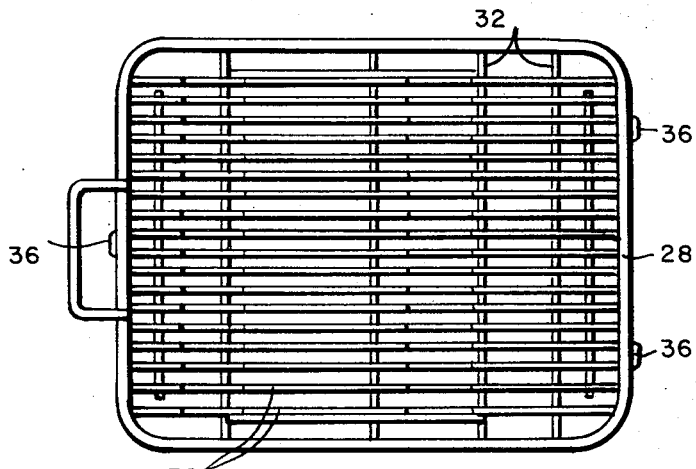
Figure 5:
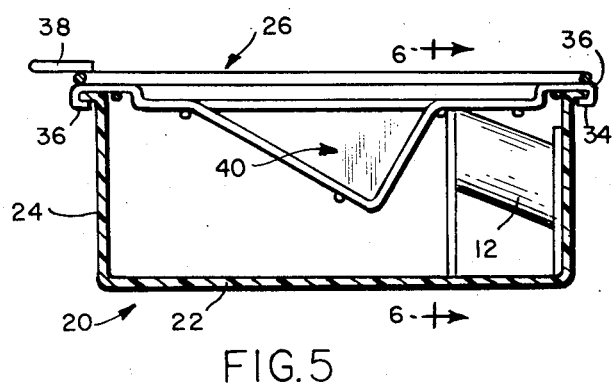
Figure 6:
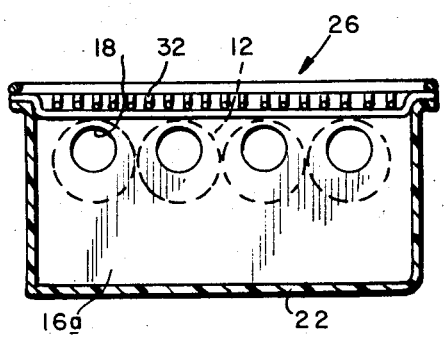

The invention will now be described in greater detail with reference to the accompanying drawings wherein:

FIG. 1 is a front elevation of the feeder;
FIG. 2 is a side elevation;
FIG. 3 is a top elevation;
FIG. 4 is a top view of the cage;
FIG. 5 is a vertical section through the cage showing the feeder therein; and
FIG. 6 is a vertical section taken on the line 6—6 of FIG. 5.

Referring to the drawings, the feeder 10 comprises a plurality of hollow tubes 12 providing chambers 14 which are secured in spaced parallel relation between a pair of spaced parallel supporting plates 16a, 16b so as to be inclined with respect to the lower edges of the plates. The plate 16a contains longitudinally thereof a plurality of circular openings 18 of smaller diameter than the chambers 14 situated eccentrically with respect thereto so as to provide relatively small openings at the upper ends of the chambers. The plate 16b is imperforate and closes the lower ends of the tubes and hence the chambers. The tubes 12 and plates 16a, 16b, as herein illustrated, are comprised of Plexiglas but may be comprised of any other suitable rigid material.

The feeder 10 is disposed in a cage comprising a receptacle 20 having a floor 22 and circumferential side wall 24, at the top of which there is a cover 26. The floor and side wall may be comprised of a non-perforate material such as Plexiglas or may be comprised of an open wire construction. The cover is in the form of a wire grid comprising a border wire 28 to which are secured longitudinally spaced parallel wires 30 reinforced by transversely extending, spaced parallel wires 32. The side wall 24 is provided with an outwardly extending flange 34 and the border wire 28 of the cover is provided with inwardly extending hooks 36 for engagement with the flange 34. A handle 38 is provided for ease in attaching and detaching the cover.

As herein illustrated and in accordance with this invention the longitudinally extending wires 30 of the cover have downwardly divergent portions 40 which angle downwardly from the plane of the cover in confronting relation to the open ends of the tubes toward the bottom to a level just below the lower side of the tubes 12 so as to provide between them and the ends of the tubes restricted access to the openings 18 to the chambers so that a rodent standing on the floor with its head thrust through an opening 18 at the open end of the chamber would find it impossible to raise itself to an extent to thrust its shoulders and fore legs into the chamber. It is thus possible with this construction to prevent a rodent from thrusting its feet into the chamber and/or climbing into the chamber.

In use the chambers of the feeder are filled with predetermined weights of food of a predetermined kind or of different kind whereupon it is placed in the receptacle together with a rodent and the cover latched down to hold it rigidly in place. The length of time that a rodent is feeding is determined and the amount of food consumed by observing the difference between the weight of the food initially placed in the chambers and that which is left. Since the rodent is prevented from climbing into the chambers there is little or no loss of food therefrom by scattering and hence accurate results can be obtained. By providing the several chambers different kinds of food may be placed in the feeder to enable determining the acceptability and preference of one kind of food in comparison to another.

It should be understood that the present disclosure is for the purpose of illustration only and that this invention includes all modifications and equivalents falling within the scope of the appended claims.

I claim:

1. A combination cage and feeder, said cage comprising a receptacle having a floor, a side wall circumscribing the floor and a removable top, the latter, at least, containing openings, and the feeder comprising a chamber having open and closed ends, legs attached to the chamber for supporting the chamber above the floor of the cage with the open end at a higher level than the closed end, and at a height such that the top of the feeder at the open end is engaged by the cover, the latter operating to hold the feeder against movement within the cage, and means angling downwardly from the cover in confronting relation to the open end of the chamber such as to prevent a rodent standing on the floor from raising itself into the open end.

2. A device according to claim 1, wherein the chamber comprises a hollow tube supported at its ends between spaced parallel plates fastened to the closed and open ends thereof, said plate constituting said leg and said plate at the open end containing a circular opening of smaller diameter than the chamber, the center of which is situated above the center of the chamber at its open end.

3. A device according to claim 1, wherein a plurality of spaced parallel tubes are supported between said plates, providing a plurality of spaced parallel chambers.

4. A device according to claim 1, wherein said last means comprises a deviation in the cover extending downwardly into the cage from the level of the cover at the top of the feeder at an angle thereto which diverges from the open end of the chamber, said downwardly divergent deviation being of such proximity to the open end of the chamber as to effectively prevent a rodent from climbing into the open end thereof.

5. A device according to claim 4, wherein the plate constituting the leg at the open end of the chamber together with the downwardly divergent deviation in the cover limits the space within which the animal can maneuver.

6. A combined cage and feeder, said cage comprising a receptacle having a floor, a wall circumventing the floor and a removable top provided with latch means by means of which it may be detachably locked to the top of the receptacle, said feeder comprising a plurality of tubular chambers closed at one end and open at the other, supporting members connecting the tubes in spaced parallel relation with the open ends at a higher level than the closed ends, and from the floor at a level such that the feeder substantially abuts the cover, the latter holding the feeder against the floor so as to effectively prevent movement of the feeder within the cage, said open ends of the chambers lying in a plane perpendicular to the floor and being at a height such that a rodent must stand on its hind legs to reach the open ends, and said cover embodying downwardly extending, angularly disposed parts confronting the open ends of the chambers at such an angle and at such proximity thereto as to effectively prevent a rodent from raising itself into the open ends of the chambers.

7. A device according to claim 6, wherein the upper extremities of said parts are situated substantially at the level of the upper sides of the openings and the lower extremities are situated substantially at the level of the lower sides of the openings.

* * * * *